Patented May 3, 1938

2,116,220

UNITED STATES PATENT OFFICE 2,116,220

METHOD OF TREATING PETROLEUM WAX

Bernard H. Shoemaker, Hammond, Ind., assignor to Standard Oil Company, Chicago, Ill., a corporation of Indiana No Drawing. Application May 4, 1936, Serial No. 77,787

10 Claims. (Cl. 87—19)

This invention relates to the method of preventing paraffin waxes from becoming rancid and developing objectionable odors.

Paraffin wax is prepared from the wax-bearing distillates of crude oil. Generally, the first step in removing the wax from the oil is to chill the wax distillate to a temperature where substantially all of the wax solidifies. The chilled distillate is then pumped through a filter press or some suitable filtering device for the purpose of removing the solidified wax from the oil. The wax cake removed from the filtering device, usually referred to as slack wax, is then sweated in order to remove a substantial part of the oil from the wax. After the oil content of the paraffin wax has been reduced to the desired amount, the wax may be fractionated, by melting into fractions of wax having different ranges of melting points. Certain fractions of wax may melt between 120–124° F.; 124–130° F. and 130–135° F. The various fractions of wax recovered from the sweating operation are placed in storage tanks or run into molds.

During storage, these waxes tend to develop an objectionable odor. This deterioration occurs in the waxes even if they are stored in solid form. It is interesting to note that the development of objectionable odors in the wax does not depend upon its exposure to air because the wax in the interior of the solid blocks forms objectionable odors to the same extent as the wax on the exterior of the blocks of wax. I have tried various methods for removing those constituents from the wax which are responsible for the formation of this objectionable odor. For example, I have treated the sweated wax with acid and clay prior to passing them to storage but I find that these treatments only temporarily prevent the formation of those constituents in the wax which are responsible for the development of objectionable odors therein. Of course, these acid treating and clay treating processes improve the color of the wax but they do not change the chemical composition of the wax so as to prevent the formation of rancid and objectionable odors during storage.

I have attempted to prevent paraffin waxes from developing objectionable odors by adding thereto certain addition agents or anti-catalysts such as alkylated polyhydroxy benzenes, but such attempts have been unsuccessful. I have also added these addition agents to the paraffin waxes shortly after sweating or promptly after the separation from the mineral oil but such attempts have failed to prevent the development of objectionable odors in these waxes during storage at room temperatures.

I have discovered, however, that certain classes of addition agents will prevent paraffin waxes from developing objectionable odors during storage if these addition agents are added to a paraffin wax promptly after it has been strained through clay. Examples of such clays are fuller's earth, bauxite, Attapulgus clay, spent Attapulgus clay and spent fuller's earth which are not effective for decolorizing wax, and similar finely divided siliceous materials. By straining the molten wax through these clays, the constituents in the wax which are responsible for odor formation are apparently altered in such a way that the addition agents, hereinafter mentioned, are then capable of inhibiting odor formation in the wax.

Examples of these addition agents are as follows: the alkylated polyhydroxy benzene compounds, such as the butyl, tertiary butyl, amyl, tertiary amyl, and octyl derivatives of catechol, pyrogallol and hydroquinone. The acyl derivatives of polyhydroxy phenols may also be used. Specific examples of these materials are 1-2-dihydroxy-4-tertiarybutyl benzene, 1-2-dihydroxy-4-tertiaryamyl benzene, octyl catechol, octyl pyrogallol, decyl pyrogallol, butyryl pyrogallol, stearyl pyrogallol. The hydroxy naphthalenes and their derivatives such as alpha-naphthol, beta-naphthol, alkyl derivatives of these naphthols such as octyl beta-naphthol, butyl and tertiary butyl alpha and beta naphthol may also be used. Another example of hydroxy aryl compounds that may be used are the hydroxy diphenyl compounds such as para-hydroxy diphenyl. One or an admixture of these addition agents is added to the wax promptly after the clay treatment. These addition agents are added in very small quantities usually ranging from 0.0001% to 0.0009%. I have found, however, that very satisfactory results can be obtained by using concentrations of these addition agents within the range of 0.0001% to 0.0005%. The addition agents may be incorporated in the wax by adding a concentrated solution of the addition agents in molten wax to the batch of wax to be stabilized. These stabilized waxes may be stored at room temperature for a period exceeding two years without odor formation.

For purposes of illustration, I will describe one method which I have used in order to prepare paraffin waxes in accordance with my invention. The cuts of wax, having different ranges of melting points, are run from the sweating ovens into various tanks. The particular cut of wax to be stabilized is then withdrawn from the container and filtered through a bed of clay (to give a yield of about 3000-6000 gals./ton of clay) to give a wax which has a satisfactory color. After adding about 0.0001% of tertiarybutyl catechol to this wax, promptly after clay treating, it is ready for shipment and may be stored for two years or more without the formation of objectionable odors therein. If a wax is desired which does not have a color specification, it may be strained through the above mentioned used clay (to a yield of about 30,000 gals./ton of clay) and then stabilized with about 0.0001% of tertiarybutyl catechol. Even though this strained wax may not be white, it may be stored for two years or more without objectionable odor forming therein. The temperature of the wax in the above treatment usually ranges from 150-170° F. and the rate of flow through the clay is about 20-50 gals./hour for each ton of clay and the straining is usually performed at a pressure of about 25 lbs. These operating conditions may vary considerably without departing from the invention.

The following refining procedure may be employed when the seasonal demands for highly refined or white wax varies to a considerable extent. Those cuts of wax which are in demand are filtered through new clay, as above indicated, and then stabilized with one of the addition agents hereinbefore mentioned. This wax has a satisfactory color and may be stored without odor formation. The remaining cuts of wax are strained through the clay which is no longer suitable for improving the color of the wax. This strained wax is then stabilized with a very small quantity of an addition agent and then passed to storage. When this stabilized wax is ready for use, it is heated to about 150-170° F., and filtered through new clay in order to impart the desired color. In order to insure the presence of an anti-catalyst in this filtered wax, an additional amount of an anti-catalyst should be added, for example about 0.0001% of tertiarybutyl catechol. It should be understood that the only reason for using new clay in the treatment of these waxes is to impart a desirable color to the wax. It is true, however, that this new clay will alter the wax in the same manner as used clay so that the addition agents will be effective in preventing odor formation during storage. If this straining and treating procedure is not used on wax going to storage, it is almost impossible to obtain, without considerable loss of material, a wax which will not develop odor upon storage.

The following data clearly illustrates the effectiveness in the herein claimed method of preventing undesirable odors and rancid conditions from forming in paraffin wax stored at a temperature of about 150° F.

According to the available data on correlation tests, the stabilized wax in Example 6 can be stored at atmospheric temperature for about 2 years without the development of objectionable odor and the stabilized wax in Example 3 may be stored under the same conditions from 3 to 5 years without odor formation. On the other hand, the wax in Example 1 would develop an objectionable odor when stored at room temperature in about 6 weeks or less. It should be observed that the above data relate to the effectiveness of the anti-catalyst when used in 0.0001% concentration, however, a longer stability can be obtained by increasing this concentration.

It is essential that the wax be relatively free from odor before adding the anti-catalyst or addition agent. As indicated by Example 2 above, a small quantity of the anti-catalyst is ineffective in preventing the development of undesirable odors in sweated waxes which have not been treated with clay to remove those constituents responsible for odor formation.

Paraffin waxes containing addition agents, of the type herein described, may be used for all of its normal purposes but such waxes are particularly useful for the preparation of waxed papers or waxed containers which are used to enclose food products.

While I have described my invention with the aid of specific examples, it should be understood that the herein claimed invention is not limited thereby except as defined by the claims hereinafter.

I claim:

1. The method of preventing the development of rancid odor in solid paraffin wax during storage, which comprises straining said wax in a molten condition through clay and immediately thereafter incorporating in said molten wax a very small quantity of a wax-soluble phenolic compound.

2. The method of preventing the development of undesirable odor during storage in hydrocarbon wax separated from petroleum oils, which comprises straining said wax in a molten condition through a bed of finely divided clay and promptly thereafter incorporating in said wax while in the molten condition not more than 0.0005% of a wax-soluble phenolic compound.

3. The method of preventing the development of undesirable odor in paraffin wax during storage, which comprises straining said wax in a molten condition through clay and immediately thereafter incorporating in said wax a very small quantity of an alkylated polyhydroxy benzene.

4. The method of preventing the development of undesirable odor during storage in hydrocarbon waxes separated from petroleum oil, which comprises straining said wax through a bed of clay

| Example | Sample tested | Results of storage at 150° F. |
|---|---|---|
| 1 | Sweated paraffin wax | Rancid odor in less than one week. |
| 2 | (1)+0.0002% tertiary butyl catechol. | No improvement. |
| 3 | Sweated wax (clay treated) | Rancid odor in about 4 weeks. |
| 4 | (3)+0.0001% tertiary butyl catechol. | Slight rancid odor in about 26 weeks. |
| 5 | Wax referred to in Example 1, filtered through clay which had already been used to treat 18,000-20,000 gallons of molten wax per ton. | Rancid odor in about 2 weeks. |
| 6 | (5)+0.0001% tertiary butyl catechol. | Rancid odor in about 13 weeks. | and promptly thereafter incorporating in said wax not more than 0.0005% of a substituted polyhydroxy benzene, said substituent being attached directly to the benzene nucleus and selected from the group consisting of alkyl and acyl radicals containing from 4 to 10 carbon atoms each.

5. The method of preventing the development of undesirable odor during storage in hydrocarbon wax separated from petroleum oils, which comprises straining said wax in a molten condition through a bed of finely divided clay and promptly thereafter incorporating in said wax while in the molten condition not more than 0.0005% of a hydroxy naphthalene compound.

6. The method of preventing the development of undesirable odor during storage in hydrocarbon wax separated from petroleum oils, which comprises straining said wax in a molten condition through a bed of finely divided clay and promptly thereafter incorporating in said wax while in the molten condition not more than 0.0005% of tertiary butyl catechol.

7. The method of preventing the development of rancid odor in solid paraffin wax during storage, which comprises straining said wax in a molten condition through spent clay and promptly thereafter incorporating in said molten wax a very small quantity of a wax-soluble phenol.

8. The method of preventing the development of undesirable odor during storage in hydrocarbon waxes separated from petroleum oil, which comprises straining said wax through a bed of spent clay and promptly thereafter incorporating in said wax not more than 0.0005% of a substituted polyhydroxy benzene, said substituent being attached to the benzene nucleus.

9. The method of preventing the development of undesirable odor during storage in solid hydrocarbon waxes separated from petroleum oil, which comprises straining said wax through a bed of spent clay and promptly thereafter dissolving in said wax not more than 0.0005% of a hydrocarbon substituted polyhydroxy benzene, said substituent being attached directly to the benzene nucleus and containing at least four carbon atoms.

10. The method of preventing the development of rancid odor in a paraffin wax during storage, which comprises straining said wax in a molten condition through clay and immediately thereafter incorporating in said molten wax a very small quantity of an alkylated naphthol.

BERNARD H. SHOEMAKER.